(12) United States Patent
Ramani et al.

(10) Patent No.: US 11,099,846 B2
(45) Date of Patent: Aug. 24, 2021

(54) APPARATUS AND METHOD FOR RESYNCHRONIZATION PREDICTION WITH VARIABLE UPGRADE AND DOWNGRADE CAPABILITY

(71) Applicant: Advanced Micro Devices, Inc., Santa Clara, CA (US)

(72) Inventors: Krishnan V. Ramani, Santa Clara, CA (US); Chetana N. Keltcher, Lexington, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/013,069

(22) Filed: Jun. 20, 2018

(65) Prior Publication Data
US 2019/0391808 A1    Dec. 26, 2019

(51) Int. Cl.
*G06F 9/30*   (2018.01)
*G06F 9/38*   (2018.01)

(52) U.S. Cl.
CPC ........ *G06F 9/30043* (2013.01); *G06F 9/3016* (2013.01); *G06F 9/30189* (2013.01); *G06F 9/3842* (2013.01)

(58) Field of Classification Search
None
See application file for complete search history.

(56) References Cited

U.S. PATENT DOCUMENTS

| | | | |
|---|---|---|---|
| 5,666,506 A * | 9/1997 | Hesson | G06F 9/383 711/E12.02 |
| 5,889,974 A | 3/1999 | Harriman et al. | |
| 6,035,394 A * | 3/2000 | Ray | G06F 9/30043 712/245 |
| 6,108,770 A * | 8/2000 | Chrysos | G06F 9/30043 712/216 |
| 6,505,293 B1 | 1/2003 | Jourdan et al. | |
| 6,675,372 B1 * | 1/2004 | Damron | G06F 9/3842 712/E9.05 |
| 6,854,075 B2 | 2/2005 | Mukherjee et al. | |
| 6,859,860 B2 | 2/2005 | Saito et al. | |
| 7,506,106 B2 | 3/2009 | Diefendorff | |
| 7,590,825 B2 * | 9/2009 | Krimer | G06F 9/3017 712/216 |

(Continued)

OTHER PUBLICATIONS

'Speculation Techniques for Improving Load Related Instruction Scheduling' by Adi Yoaz et al., 1999. (Year: 1999).*

(Continued)

*Primary Examiner* — Steven G Snyder
(74) *Attorney, Agent, or Firm* — Faegre Drinker Biddle & Reath LLP

(57) ABSTRACT

A method and apparatus generates control information that indicates whether to change a counter value associated with a particular load instruction. In response to the control information, the method and apparatus causes a hysteresis effect for operating between a speculative mode and a non-speculative mode based on the counter value. The hysteresis effect is in favor of the non-speculative mode. The method and apparatus causes the hysteresis effect by incrementing the counter value associated with the particular load instruction by a first value or decrementing the counter value by a second value. The first value is greater than the second value.

23 Claims, 8 Drawing Sheets

(56) References Cited

U.S. PATENT DOCUMENTS

| | | | |
|---|---|---|---|
| 7,770,064 B2 | 8/2010 | Harper et al. | |
| 8,392,757 B2 | 3/2013 | Ramani et al. | |
| 8,812,823 B2* | 8/2014 | Krimer | G06F 9/3838 |
| | | | 712/216 |
| 9,495,156 B1* | 11/2016 | Alexander | G06F 9/30021 |
| 9,594,566 B1* | 3/2017 | Alexander | G06F 9/30021 |
| 9,606,805 B1* | 3/2017 | Alexander | G06F 9/30021 |
| 9,619,750 B2* | 4/2017 | Kim | G06N 5/04 |
| 10,067,762 B2* | 9/2018 | Agarwal | G06F 9/30043 |
| 10,437,595 B1* | 10/2019 | Kanapathipillai | G06F 9/30145 |
| 2004/0225870 A1 | 11/2004 | Srinivasan et al. | |
| 2007/0226470 A1* | 9/2007 | Krimer | G06F 9/3017 |
| | | | 712/225 |
| 2008/0082765 A1 | 4/2008 | Hily et al. | |
| 2009/0063773 A1* | 3/2009 | Rajwar | G06F 9/3826 |
| | | | 711/125 |
| 2012/0102357 A1 | 4/2012 | Ramani et al. | |
| 2012/0303934 A1* | 11/2012 | Kaplan | G06F 9/30043 |
| | | | 712/205 |
| 2013/0073833 A1* | 3/2013 | Konigsburg | G06F 9/3834 |
| | | | 712/205 |
| 2013/0298127 A1* | 11/2013 | Meier | G06F 9/3834 |
| | | | 718/100 |
| 2015/0006452 A1* | 1/2015 | Kim | G06N 5/04 |
| | | | 706/21 |
| 2015/0095629 A1 | 4/2015 | Abdallah | |
| 2015/0186285 A1 | 7/2015 | Kitchin | |
| 2015/0309797 A1 | 10/2015 | Wilson et al. | |
| 2018/0004522 A1* | 1/2018 | Agarwal | G06F 9/3838 |
| 2018/0052613 A1 | 2/2018 | McDaniel et al. | |

OTHER PUBLICATIONS

'Dynamic Speculation and Synchronization of Data Dependences' by Andreas Moshovos et al., 1997. (Year: 1997).*

'Memory Dependence Prediction and Access Ordering for Memory Disambiguation and Renaming' by Onur Mutlu, 2001. (Year: 2001).*

'AMD64 Technology Speculative Store Bypass Disable' White Paper by AMD May 21, 2018. (Year: 2018).*

U.S. Patent and Trademark Office; Notice of Allowance; U.S. Appl. No. 12/910,136; dated Nov. 5, 2012.

U.S. Patent and Trademark Office; Non-Final Office Action; U.S. Appl. No. 12/910,136; dated Oct. 2, 2012.

Korean Intellectual Property Office; International Search Report and Written Opinion; International Application No. PCT/US2019/037162; dated Oct. 4, 2019.

* cited by examiner

RESYNC PREDICTOR TABLE 140

| INCORRECTLY EXECUTED INSTRUCTION ADDRESSES 610 | COUNTER VALUE 620 |
|---|---|
| INSTRUCTION ADDRESS 1 | 16 |
| INSTRUCTION ADDRESS 2 | 25 |
| INSTRUCTION ADDRESS 3 | 48 |
| INSTRUCTION ADDRESS 4 | 60 |
| | |
| | |

FIG. 6

APPARATUS AND METHOD FOR RESYNCHRONIZATION PREDICTION WITH VARIABLE UPGRADE AND DOWNGRADE CAPABILITY

BACKGROUND OF THE DISCLOSURE

Modern high performance processors execute load and store instructions out-of-order (speculatively). There are occasions where a load may be erroneously executed before it has seen the correct interlocking store. For example, when a store to a memory address and a load to the same memory address are executed out of order, the load to the memory address may occur prior to the store to the memory address. Thus, when executing the load instruction as part of an instruction execution pipeline, the processor may obtain an erroneous value from the memory address. When such occasions are detected, the errant load is re-executed by resynchronizing (resyncing) so that the load and all younger instructions in the pipeline are flushed. Although this ensures that load instructions are correctly executed, each of these resyncs wastes efficiency, resulting in loss of performance.

To compensate for loss of performance, processors may use logic to predict erroneously executed loads for a memory address. For example, processors may switch between executing instructions in-order (non-speculatively) and out-of-order when detecting a load with a higher risk of incorrectly executing. One load instruction for the memory address may operate correctly, but the next load instruction for the memory address may cause an error. Therefore, the processors may continuously switch between non-speculative and speculative operation. Thus, again, this may cause additional resynchronizations, resulting in loss of performance. Accordingly, there exists a need for one or more improved methods and apparatuses in order to address one or more of the above-noted drawbacks.

BRIEF DESCRIPTION OF THE DRAWINGS

The embodiments will be more readily understood in view of the following description when accompanied by the below figures and wherein like reference numerals represent like elements, wherein:

FIG. 6 is an exemplary representation of a resync predictor table in accordance with one embodiment set forth in the disclosure;

DETAILED DESCRIPTION OF EMBODIMENTS

Figure 1:
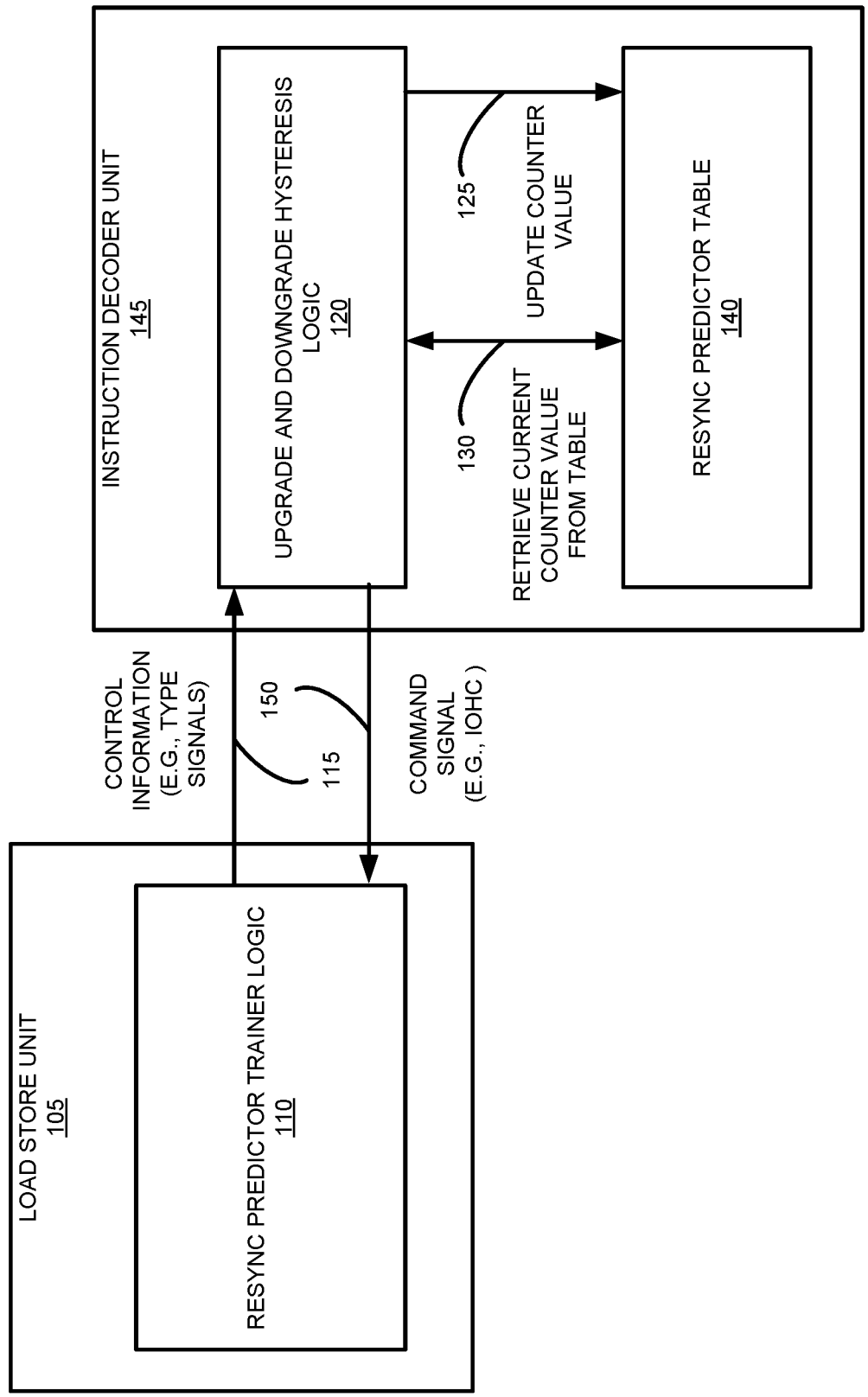
FIG. 1 is a schematic block diagram illustrating an apparatus for executing load instructions in accordance with one embodiment set forth in the disclosure.

Briefly, in some examples, an apparatus provides a method for executing load instructions using a resynchronization (resync) predictor with variable upgrades and downgrades. For example, the apparatus includes a load store unit and an instruction decoder unit. The load store unit obtains a plurality of instructions, and either executes the instructions out-of-order (e.g., speculatively) or in-order (non-speculatively). Executing instructions out-of-order allows the load store unit to operate more effectively. However, it can cause improper executions of load instructions (e.g., a load instruction executes prior to a dependent store instruction).

In some implementations, to prevent the improper execution of load instructions, the method and apparatus uses counter values to determine whether to execute instructions speculatively or non-speculatively. For example, the method and apparatus determines counter values for improperly executed load instructions. The counter values indicate the risk involved in executing the load instructions out-of-order. After executing and/or re-executing a load instruction, the method and apparatus generates control information that indicates whether to change a counter value associated with a particular load instruction. In response to the control information, the method and apparatus causes a hysteresis effect for operating between a speculative mode and a non-speculative mode based on the counter value. The hysteresis effect is in favor of the non-speculative mode. The method and apparatus causes the hysteresis effect by incrementing the counter value associated with the particular load instruction by a first value or decrementing the counter value by a second value. The first value is greater than the second value.

In some examples, the method and apparatus generates a command signal that causes the load store unit to execute a plurality of decoded instructions in the speculative mode or the non-speculative mode based on comparing the counter value to a threshold value. In some implementations, the command signal is an in order hazard check signal (IOHC signal) that causes the load store unit to execute the plurality of decoded instructions in the non-speculative mode. In some implementations, the load store unit executes a plurality of instructions out of order in the speculative mode. Further, the load store unit executes the plurality of instructions in order in the non-speculative mode.

In some examples, the method and apparatus determines that an instruction, from a plurality of decoded instructions, is an older store instruction indicating a memory address associated with the particular load instruction. The method and apparatus generates the control information based on the determining that the instruction is the older store instruction and based on an IOHC signal. In some implementations, the method and apparatus generates an upgrade signal. The upgrade signal directs the instruction decoder unit to increment the counter value by an upgrade value.

In some examples, the method and apparatus determines that a plurality of decoded instructions does not contain an older store instruction indicating a memory address corresponding to the particular load instruction. The method and apparatus generates the control information based on the determining that the plurality of decoded instructions does not contain the older store instruction indicating the memory address and an IOHC signal. In some implementations, the method and apparatus generates a downgrade signal. The downgrade signal directs the instruction decoder unit to decrement the counter value by a downgrade value.

In some examples, the method and apparatus determines that the control information includes an upgrade signal associated with the particular load instruction and a downgrade signal associated with the particular load instruction. The method and apparatus updates, in a resync predictor table, the counter value associated with the particular load instruction. The upgrade signal increments the counter value by a first value. The downgrade signal decrements the counter value by a second value. The first value is greater than the second value.

FIG. 1 illustrates one example of an apparatus 100, such as an image processing device, for executing load and store instructions. In some implementations, the apparatus 100 includes any type of computing device suitable for implementing aspects of embodiments of the disclosed subject matter. Examples of computing devices include but are not limited to "workstations," "servers," "cloud computing platforms", "laptops," "desktops," "tablet computers," "handheld devices," "game consoles," "general-purpose graphics processing units (GPGPUs)," "APUs," "CPUs," "GPUs," "wearables," displays, printers, integrated circuits and the like, all of which are contemplated within the scope of FIG. 1, with reference to various components of the apparatus 100.

In some examples, the apparatus 100 includes a load store unit 105 and an instruction decoder unit 145 as part of an instruction execution pipeline. The load store unit 105 includes a resync predictor trainer logic 110. The load store unit 105 generates and/or provides control information 115 to the instruction decoder unit 145. The instruction decoder unit 145 includes an upgrade and downgrade hysteresis logic 120 and a resync predictor table 140. The upgrade and downgrade hysteresis logic 120 transmits and obtains (e.g., receives and/or retrieves) data (e.g., retrieve current counter value 130) from the resync predictor table 140. Additionally, the instruction decoder unit 145 generates and/or transmits one or more command signals 150 to the load store unit 105.

The illustrative apparatus 100 is not intended to suggest any limitation as to the scope of use or functionality of embodiments of the present disclosure. Neither should the illustrative apparatus 100 be interpreted as having any dependency or requirement related to any single component or combination of components illustrated therein. Additionally, various components depicted in FIG. 1, in embodiments, may be integrated with various ones of the other components depicted therein (and/or components not illustrated).

Figure 2:
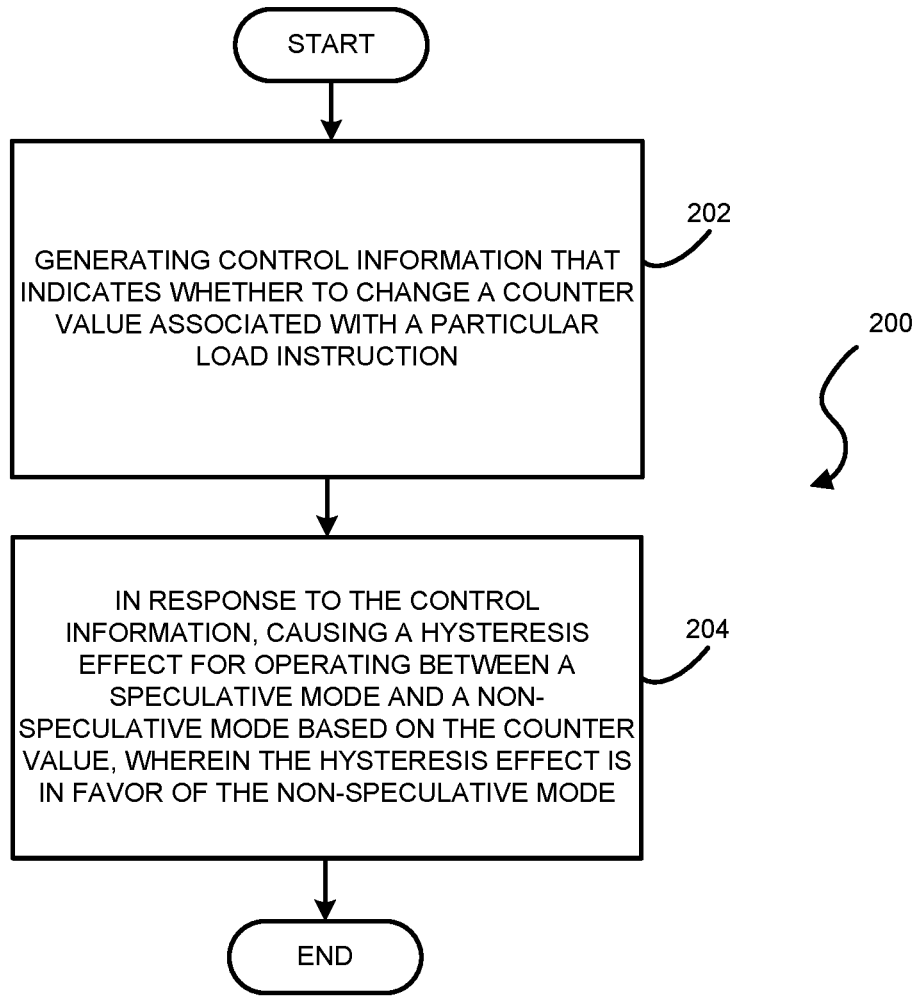
FIG. 2 is a flowchart illustrating a method for executing load instructions in accordance with one embodiment set forth in the disclosure.

FIG. 2 illustrates one example of a method 200 for executing load instructions. FIG. 2 is described below in reference to the apparatus 100 illustrated in FIG. 1. However, any suitable structure can be employed. For example, as explained in further detail below, in some implementations, method 200 is implemented using the load store unit 105 and the instruction decoder unit 145 illustrated in FIGS. 3 and 4.

In operation, at step 202, the resync predictor trainer logic 110 generates control information 115 that indicates whether to change a counter value associated with a particular load instruction. After generating the control information 115, the load store unit 105 transmits the control information 115 to the instruction decoder unit 145.

At step 204, in response to the control information, the instruction decoder unit 145 causes a hysteresis effect for operating between a speculative mode and a non-speculative mode based on the counter value. The hysteresis effect is in favor of the non-speculative mode. For example, the upgrade and downgrade hysteresis logic 120 obtains control information 115 from the resync predictor trainer logic 110, and the control information 115 indicates a particular load instruction. The particular load instruction indicates an instruction address. Based on the instruction address, the upgrade and downgrade hysteresis logic 120 retrieves the current counter value for the instruction address from the resync predictor table 140.

Then, as will be explained in further detail below in FIGS. 3 and 4, the upgrade and downgrade hysteresis logic 120 increments or decrements the current counter value based on the control information 115. For example, the control information 115 includes one or more variable type signals. The variable type signals are either upgrade signals (e.g., increment the counter value), install signals (e.g., increment the counter value), or downgrade signals (e.g., decrement the counter value). Depending on the variable type signal, the upgrade and downgrade hysteresis logic 120 either increments the current counter value by a first value or decrements the current counter value by a second value. The first value is greater than the second value, which causes a hysteresis effect in favor of the non-speculative mode.

After incrementing or decrementing the current counter value, the upgrade and downgrade hysteresis logic 120 transmits an updated counter value 125 to the resync predictor table 140. The upgrade and downgrade hysteresis logic 120 uses the updated counter value 125 to determine whether to generate and/or transmit a command signal 150 (e.g., an IOHC signal) to the resync predictor trainer logic 110. The command signal 150 directs the resync predictor trainer logic 110 to execute instructions either in-order (non-speculatively) or out-of-order (speculatively). The method 200 will be described in further detail below with reference to FIGS. 3 and 4.

Figure 3:
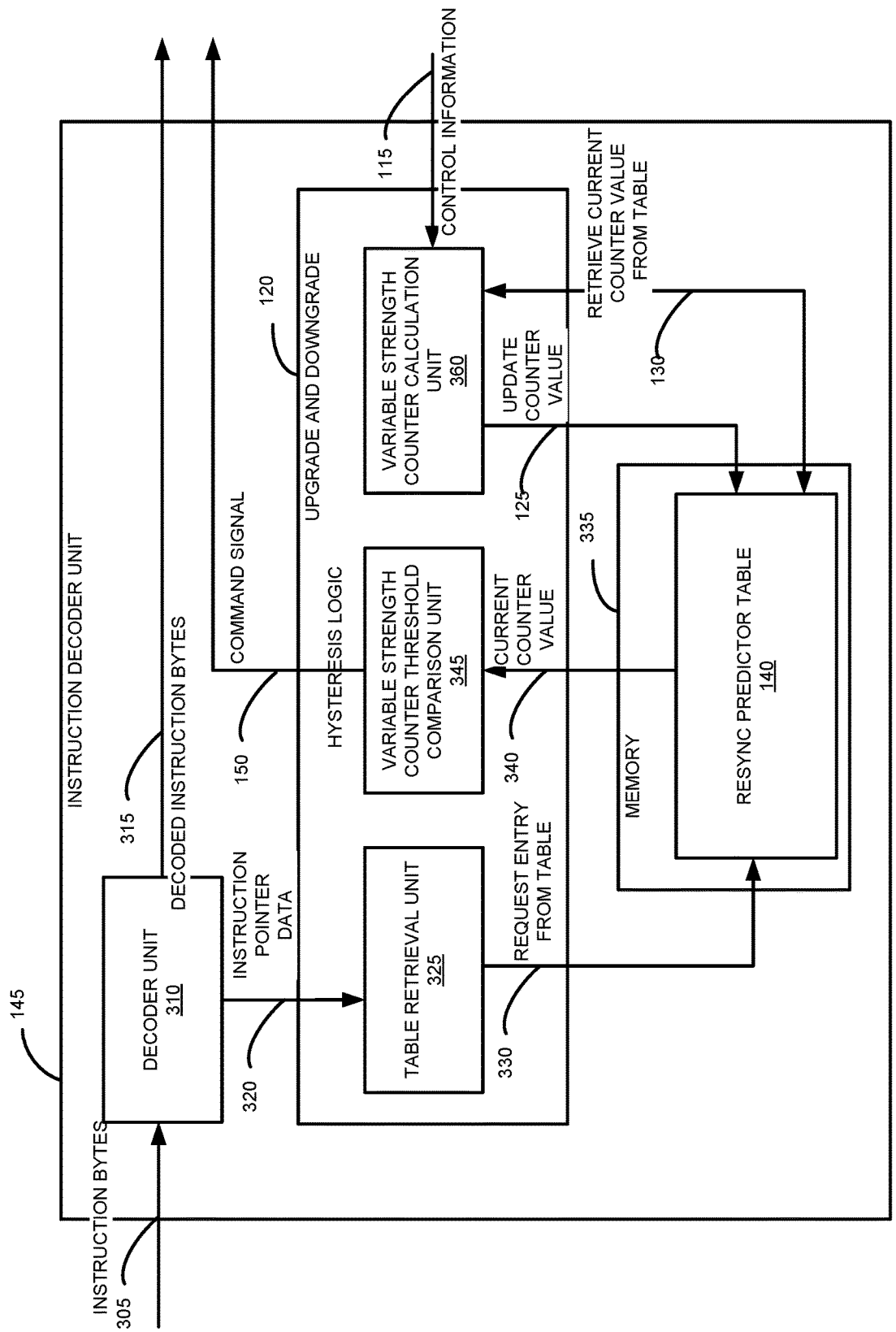
FIG. 3 is a schematic block diagram illustrating an example of an instruction decoder unit for executing load instructions in accordance with one embodiment set forth in the disclosure.

FIG. 3 illustrates an example of the instruction decoder unit 145. The instruction decoder unit 145 includes a decoder unit 310, the upgrade and downgrade hysteresis logic 120, and memory 335. The memory 335 includes the resync predictor table 140. The upgrade and downgrade hysteresis logic 120 includes a table retrieval unit 325, a variable strength counter threshold comparison unit 345, and a variable strength counter calculation unit 360. Although these sub-units 310, 325, 345, 360, 120, 335, and 140 are illustrated as children units subordinate of the parent unit, each sub-unit can be operated as a separate unit from the instruction decoder unit 145, and other suitable combinations of sub-units are contemplated to suit different applications. The instruction decoder unit 145 is any suitable logic configuration including, but not limited to, one or more state machines, one or more digital signal processors, as part of one or more CPUs, GPUs, APUs or processors that execute kernels, and/or other suitable structure as desired. Further, as described in further detail below, the instruction decoder unit 145 generates one or more command signals 150 directing the load store unit to execute instructions from a first mode (e.g., speculative or non-speculative) to a second mode (e.g., non-speculative or speculative).

In operation, the instruction decoder unit 145 obtains (e.g., receives, retrieves, and/or fetches) instruction bytes 305, such as program instructions. For example, the decoder unit 310 obtains the instruction bytes 305 from memory, such as an instruction cache (e.g., a L1 or L2 instruction cache). After obtaining the instruction bytes 305, the decoder unit 310 decodes the instructions. For example, each instruction has a unique set of bits that includes the operations (e.g., add, multiply, load, store), and operand values (e.g., floating point value or a numerical value), and/or pointers (e.g., instruction pointers (IP) or instruction addresses) indicating memory addresses. In some examples, a decoded instruction is a load instruction or a store instruction to a particular memory address.

After decoding the instructions, the decoder unit 310 transmits decoded instruction bytes 315. For example, the load store unit 105 obtains the decoded instruction bytes 315. In some variations, the decoded instruction bytes 315 include a single decoded instruction. In other variations, such as, but not limited to, when the load store unit is performing operations out-of-order (speculatively), the decoded instruction bytes 315 include a plurality of decoded instructions (e.g., a plurality of load and store instructions).

Additionally, and/or alternatively, in some examples, the decoder unit 310 transmits instruction pointer data 320 to the table retrieval unit 325. For instance, when the decoder unit 310 decodes an instruction indicating a memory access (e.g., a load instruction and/or a store instruction), the decoder unit 310 transmits instruction pointer data 320 to the table retrieval unit 325. The instruction pointer data 320 includes one or more instruction addresses (e.g., instruction pointers indicating one or more memory addresses).

The table retrieval unit 325 obtains the instruction pointer data 320. Using the instruction pointer data 320, the table retrieval unit 325 generates a request (e.g., request entry from table) 330 for data. The table retrieval unit 325 transmits the request to the resync predictor table 140. FIG. 6 illustrates an exemplary representation of a resync predictor table 140. The resync predictor table 140 includes one or more incorrectly executed instruction addresses 610 and a counter value 620. In some examples, such as at start-up, the resync predictor table 140 is empty. As described below, on commands from the load store unit 105, the instruction decoder unit 145 populates (e.g., adds or installs) entries into the resync predictor table 140. Additionally, and/or alternatively, on commands from the load store unit 105, the instruction decoder unit 145 changes (e.g., increments, decrements) the counter value 620 for pre-existing entries.

The request 330 includes the instruction address (e.g., the instruction pointer indicating the memory address for the load or store instruction). In response to the request 330, the variable strength counter threshold comparison unit 345 obtains the current counter value data 340. The current counter value data 340 includes the current counter value for the instruction address. Additionally, and/or alternatively, the resync predictor table 140 does not contain the current counter value for the instruction address (e.g., the instruction address is not in the resync predictor table 140 and/or the resync predictor table 140 is empty). In such variations, the current counter value data 340 indicates that the resync predictor table 140 does not include the instruction address indicated by the load/store instruction.

Then, the variable strength counter threshold comparison unit 345 compares the variable strength counter 620 for the instruction address with a threshold value. The threshold value is programmable and/or pre-defined. Based on the comparison of the variable strength counter 620 for the instruction address and the threshold value, the variable strength counter threshold comparison unit 345 generates and transmits one or more command signals 150. The one or more command signals 150 directs the load store unit 105 to execute instructions either speculatively (e.g., out-of-order) or non-speculatively (e.g., in-order).

In some examples, if the variable strength counter 620 is greater than or equal to the threshold value, the variable strength counter threshold comparison unit 345 generates and transmits a command signal 150, such as an in-order-hazard check (IOHC) signal (e.g., an execute instructions non-speculatively signal) to the load store unit 105. However, in other examples, if the variable strength counter 620 is less than the threshold value or if the resync predictor table 140 does not include the memory address indicated by the instruction pointer, the variable strength counter threshold comparison unit 345 generates and transmits a command signal 150, such as a normal operation signal (e.g., an execute instructions speculatively signal).

Additionally, and/or alternatively, in some examples, rather than generating a normal operation signal, the variable strength counter threshold comparison unit 345 does not generate a command signal if the resync predictor table 140 does not include the instruction address or if the variable strength counter 620 is less than the threshold value. Instead, in such examples, the load store unit 105 executes instructions speculatively unless the load store unit 105 obtains an IOHC signal (e.g., execute instructions non-speculatively signal).

Based on the obtained command signal (or lack of an IOHC signal), the load store unit 105 executes instructions speculatively or non-speculatively. After executing the instructions either speculatively or non-speculatively, the load store unit 105 generates and transmits control information 115 to the instruction decoder unit 145. The operation of the load store unit 105, including the generating and transmitting the control information 115, will be described in further detail below.

The instruction decoder unit 145 (e.g., the variable strength counter calculation unit 360) obtains the control information 115. The variable strength counter calculation unit 360 retrieves the current counter value 130 from the resync predictor table 140. For example, the variable strength counter calculation unit 360 retrieves the current counter value 130 for the instruction address indicated by the control information 115.

Then, the variable strength counter calculation unit 360 updates the counter value and provides the update counter value 125 to the resync predictor table. For example, the variable strength counter calculation unit 360 updates (e.g., changes) the current counter value based on the control information 115. The control information 115 includes an install signal, an upgrade signal, and/or a downgrade signal. The install signal will be described first, and the upgrade and downgrade signals will be described in further detail below.

If the control information 115 includes an install signal, the variable strength counter calculation unit 360 increments the current counter value by the install value (e.g., 16). After, the variable strength counter calculation unit 360 provides (e.g., stores) the update counter value 125 to the resync predictor table 140. The update counter value 125 replaces the current counter value (e.g., the current counter value 130 retrieved from the table 140) for the instruction address.

In some embodiments, rather than the install value being included in the control information 115, the variable strength counter calculation unit 360 stores the install value (e.g., 16). In response to obtaining the install signal, the variable strength counter calculation unit 360 retrieves the stored install value (e.g., 16) and updates the current counter value for the instruction address.

In some variations, the resync predictor table 140 does not include the instruction address and/or the current counter value. In such embodiments, the variable strength counter calculation unit 360 populates an entry with the instruction address of the incorrect load in column 610 and the install value in column 620. In other variations, the resync predictor table 140 does include the memory address of the incorrect load, and the variable strength counter calculation unit 360 updates the entry for the instruction address by incrementing the variable strength counter 620 with the install value (e.g., 16). In some examples, the variable strength counter calculation unit 360 uses different install values depending on if the instruction address of the incorrect load is in the resync predictor table 140. For example, if the instruction address is in the resync predictor table 140, then the variable strength counter calculation unit 360 increments the counter value 620 by 10. However, if the instruction address of the incorrect load is not in the resync predictor table 140, then the variable strength counter calculation unit 360 populates the variable strength counter 620 to 16.

Figure 4:
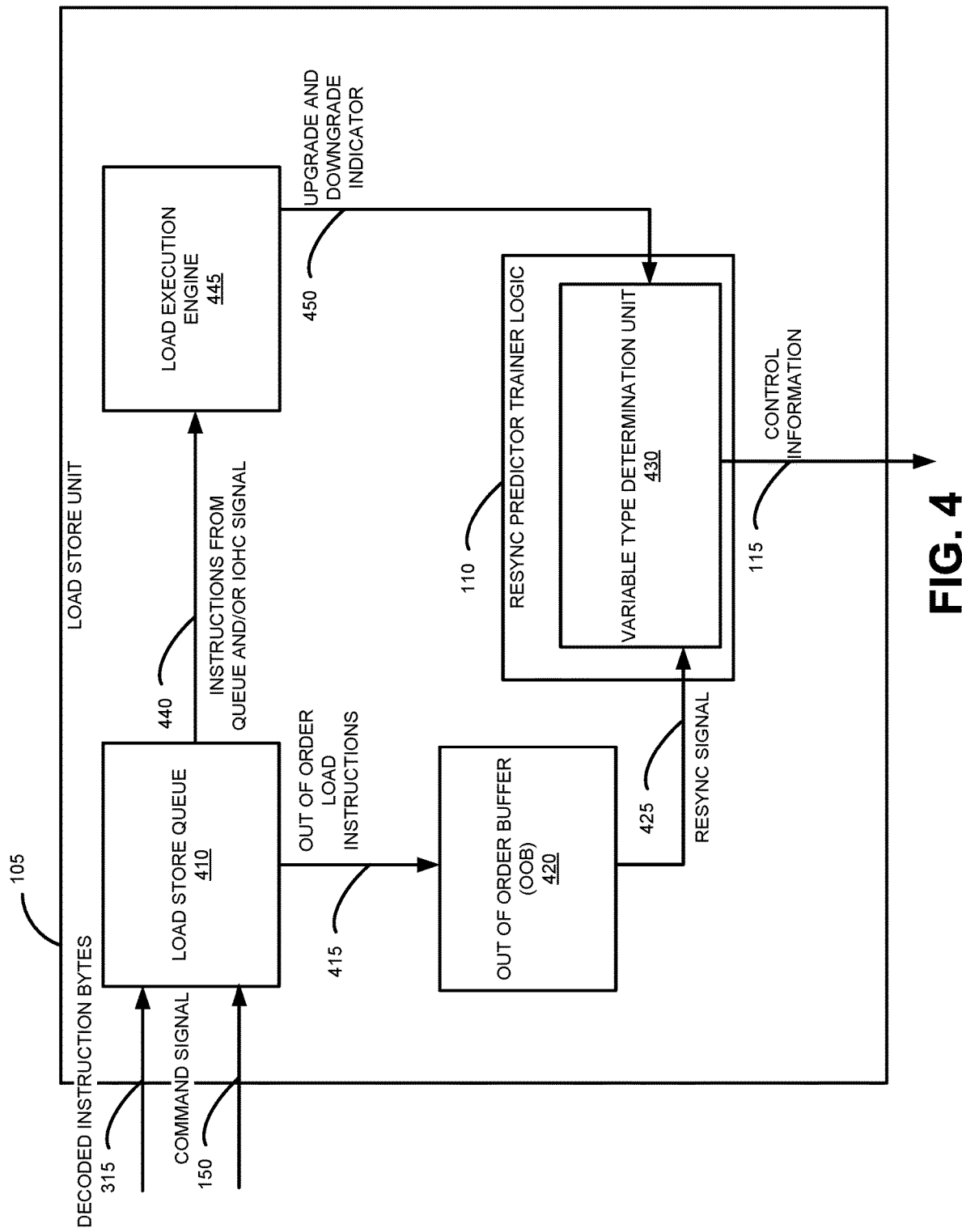
FIG. 4 is a schematic block diagram illustrating an example of a load store unit for executing load instructions in accordance with one embodiment set forth in the disclosure.

FIG. 4 illustrates an example of the load store unit 105. The load store unit 105 includes a load store queue 410, an out of order buffer (OOB) 420, a resync predictor trainer logic 110, a variable type determination unit 430, and a load execution engine 445. Although these sub-units 410, 420, 110, 430, and 445 are illustrated as children units subordinate of the parent unit, each sub-unit can be operated as a separate unit from the load store unit 105, and other suitable combinations of sub-units are contemplated to suit different applications. The load store unit 105 is any suitable logic configuration including, but not limited to, one or more state machines, one or more digital signal processors, as part of one or more CPUs, GPUs, APUs or processors that execute kernels, and/or other suitable structure as desired. Further, the load store unit 105 obtains commands and based on the commands, executes instructions (e.g., load and/or store instructions) in-order (non-speculatively) or out-of-order (speculatively).

Initially, the operation of the load store unit 105 is described in the speculative mode, and then the non-speculative mode is described. In the speculative mode, the load store queue 410 obtains one or more command signals 150 (e.g., IOHC signals) and/or decoded instruction bytes 315 as described above. The load store queue 410 stores and/or queues the decoded instruction bytes 315 (e.g., load and store instructions).

Figure 7:
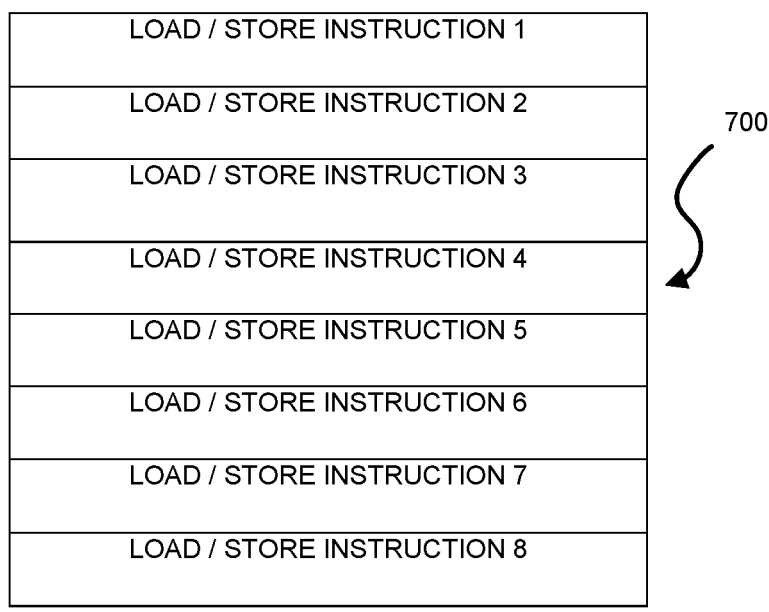
FIG. 7 is an exemplary representation of a load store queue in accordance with one embodiment set forth in the disclosure.

FIG. 7 illustrates an exemplary representation of a load store queue 410. The load store queue 410 queues eight instructions 700 (e.g., load and/or store instructions). For example, in the non-speculative mode (e.g., in-order), the load store queue 410 transmits the instructions from the queue and transmits the instructions to the load execution engine 445. The load execution engine 445 executes instructions one after another. For example, the load execution engine 445 executes instruction 1, then instruction 2, and so on. Older instructions relative to an instruction are instructions that are to be executed prior to the instruction in the queue (e.g., for instruction 4, the older instructions are instructions 1, 2, and 3). Younger instructions relative to an instruction are instructions that are to be executed after the instruction in the queue (e.g., for instruction 4, the younger instructions are instructions 5, 6, 7, and 8).

In the speculative mode, the load execution engine 445 executes one or more instructions out-of-order (e.g., instruction 4 executes prior to instruction 3). However, in one such example, instruction 3 is a store to a memory address and instruction 4 is a load from the same memory address. By executing the instructions out-of-order (e.g., instruction 4 executes prior to instruction 3), the load execution engine 445 loads a value from the memory address prior to storing the value to the memory address, creating an error in execution of the instructions.

The load store queue 410 transmits out of order load instructions 415 to the out of order buffer (OOB) 420. The OOB 420 determines values for the instructions in the load store queue 410 (e.g., the load and store instructions 1-8 in FIG. 7) and whether the values are correct. For example, when a store instruction to a memory address is executed, the OOB 420 determines whether any of the younger instructions have been executed that are load instructions to the same memory address. For instance, in the example above, by executing instructions out-of-order, the load store unit 105 executes instruction 4 (a load instruction to a memory address) prior to instruction 3 (a store instruction to the same memory address). The OOB 420 determines that instruction 4 (e.g., the younger instruction) has been executed prior to instruction 3 (e.g., the store instruction) and generates a resync signal 425. The resync signal 425 directs the load store unit 105 to re-execute the errant load (e.g., instruction 4) after the load and all younger instructions in the pipeline are flushed. Further, the OOB 420 transmits the resync signal 425 to the resync predictor trainer logic 110 and the variable type determination unit 430.

The variable type determination unit 430 determines the type of signal (e.g., resync signal 425) and generates control information 115 based on the type of signal. In some examples, when the variable type determination unit 430 determines that the type of signal is a resync signal 425 from the OOB 420, the variable type determination unit 430 generates control information 115 that includes an install signal and an install value. The install signal includes the instruction address of the incorrect load (e.g., the memory address for instruction 4). The variable type determination unit 430 transmits the control information 115, including the install signal indicating the instruction address, to the variable strength counter calculation unit 360.

The process and operation described in FIGS. 3 and 4 continuously repeat as described above. However, due to changes and/or updates to the resync predictor table 140, in some instances, the variable strength counter 620 for an instruction address is greater or equal to the threshold value. For instance, in some examples, a particular instruction address can cause multiple errant loads and/or stores such that the load needs to be re-executed constantly and all younger instructions in the pipeline need to be flushed. After each instance, the variable strength counter calculation unit 360 increases the variable strength counter 620 for the particular instruction address in the incorrectly executed load instruction addressees 610.

The next time an instruction pointer 320 for the decoded instruction bytes 315 indicates the particular instruction address, the variable strength counter threshold comparison unit 345 compares the counter value associated with that particular instruction address with the threshold value. If the updated counter value is greater than or equal to the threshold value, the variable strength counter threshold comparison unit 345 generates one or more command signals 150, such as an IOHC signal, and transmits the command signals 150 to the load store unit 105.

The load store queue 410 obtains decoded instruction bytes 315 and the IOHC signal 150. The IOHC signal 150 directs the load store unit 105 to operate from a first mode, such as a speculative mode, to a second mode, such as a non-speculative mode. For example, the IOHC signal indicates that previous load instructions for the particular instruction address have caused errors when executed out-of-order and that the load store unit 105 should execute this load instruction in-order.

After obtaining the decoded instruction bytes 315 and the IOHC signal, the load store queue 410 transmits data 440, such as one or more instructions from the queue 410 and the IOHC signal, to the load execution engine 445. In response to obtaining the IOHC signal, the load execution engine 445 transitions from the speculative mode to the non-speculative mode for that instruction. For example, referring to FIG. 7, the variable strength counter threshold comparison unit 345 generates the IOHC signal due to the instruction address indicated by instruction 4 (e.g., the instruction address for instruction 4 has previously caused errors when executed out-of-order). In response to obtaining the IOHC signal, the load execution engine 445 executes instruction 4 in order. By executing instruction 4 in order, the load store unit 105 operates less efficiently; however, the load instruction is executed correctly.

Additionally and/or alternatively, in response to obtaining the IOHC signal, the load execution engine 445 determines whether there are any older stores corresponding to the instruction address. The load execution engine 445 generates an upgrade and downgrade indicator 450 based on whether there are any older stores for the instruction address. The upgrade and downgrade indicator 450 indicates whether to upgrade or downgrade a counter value in the resync predictor table 140 for the instruction address. For example, the load execution engine 445 determines whether instructions 1, 2, or 3 (e.g., the older instructions) are store instructions to the memory address indicated by instruction 4. If there are older stores to the memory address, then the load execution engine 445 generates an upgrade indicator signal 450. If there are no older stores to the memory address, then the load execution engine 445 generates a downgrade indicator signal 450. Afterwards, the load execution engine 445 transmits the upgrade and downgrade indicator 450 to the variable type determination unit 430.

Based on the upgrade and downgrade indicator 450 (e.g., upgrade indicator signal or downgrade indicator signal), the variable type determination unit 430 generates control information 115, such as an upgrade signal or a downgrade signal. As mentioned previously, the control information 115 can also include an install signal. Thus, the control information 115 can be an upgrade signal, a downgrade signal, and/or an install signal. The upgrade signal includes the instruction address (e.g., the instruction address for instruction 4) and a first value (e.g., a variable upgrade value). The downgrade signal includes the instruction address (e.g., the instruction address for instruction 4) and a second value (e.g., a variable downgrade value). The variable upgrade value is greater than the variable downgrade value. Further, as described above, the install signal indicates the instruction address and an install value. In some embodiments, the upgrade and downgrade signals do not include the variable upgrade and downgrade values. Instead, the variable upgrade and downgrade values are stored in the variable strength counter calculation unit 360.

The variable type determination unit 430 transmits the control information 115 to the variable strength counter calculation unit 360. Then, as described above, the variable strength counter calculation unit 360 updates (e.g., changes) the current counter value for the instruction address (e.g., retrieves the current counter value 130 from the table 140, updates the counter value, and transmits the update counter value 125 to the table 140). For example, if the control information 115 is an upgrade signal, then the variable strength counter calculation unit 360 increments the current counter value by the first value (e.g., the variable upgrade value). If the control information is a downgrade signal, then the variable strength counter calculation unit 360 decrements the current counter value by the second value (e.g., the variable downgrade value). The variable upgrade value (e.g., 16) is greater than the variable downgrade value (e.g., 1). The variable strength counter calculation unit 360 updates and stores the update counter value 125 in the resync predictor table 140. In the next iteration of the process, the variable strength counter threshold comparison unit 345 uses the new counter value to determine whether it is greater than or equal to the threshold value.

In some examples, due to the variable upgrade value being greater than the variable downgrade value, the instruction decoder unit 145 and/or the load store unit 105 causes a hysteresis effect favoring the non-speculative (e.g., in-order) mode. For instance, in one such example and through multiple iterations of the apparatus 100 performing the instruction address, the variable type determination unit 430 generates control information 115 including a plurality of variable type signals for a particular instruction address. For instance, initially, the load store unit 105 operates in the speculative mode. When a particular instruction address executes improperly, the variable type determination unit 430 generates an install signal that populates an entry in the resync predictor table 140 with the particular instruction address and a counter value (e.g., 16).

In the next iteration of the instruction address, the variable strength counter threshold comparison unit 345 compares the counter value with a threshold value (e.g., 28) and does not generate an IOHC signal. After the instruction address executes improperly again, variable type determination unit 430 generates another install signal, and the variable strength counter calculation unit 360 updates the resync predictor table 140 for the instruction address (e.g., updating the counter value from 16 to 32).

In the next iteration, since the counter value is greater than the threshold value (e.g., 32>28), the variable strength counter threshold comparison unit 345 generates a command signal 150 (e.g., an IOHC signal). The IOHC signal causes the load store unit 105 to execute that instruction from the speculative mode to a non-speculative mode. Then, as mentioned above, the load execution engine 445 generates the upgrade and downgrade indicator 450. The variable type determination unit 430 generates control information 115 (e.g., upgrade or downgrade signals), and the variable strength counter calculation unit 360 updates the counter value for the particular instruction address in the resync predictor table 140. For example, if the control information 115 is an upgrade signal and since the variable upgrade value (e.g., 16) is greater than the variable downgrade value (e.g., 1), then the counter value for the instruction address is 48. If the control information 115 is a downgrade signal, then the counter value for the instruction address is 31. Thus, 16 downgrade signals (e.g., 16 different correct iterations of the instruction address) would equal the value for 1 upgrade signal.

In the next iteration, since the counter value is greater than the threshold value, the variable strength counter threshold comparison unit 345 generates a command signal 150 (e.g., an IOHC signal), and the load store unit 105 executes the instruction address non-speculatively. Due to the variable upgrade value being greater than the variable downgrade value (e.g., 16>1), it takes multiple downgrade signals (e.g., 16 downgrade signals or 16 operations of the particular instruction address) to equal one upgrade signal. In other words, due to the number of downgrade signals required to equal one upgrade signal, a hysteresis effect occurs that causes the load store unit 105 to operate in favor of the non-speculative mode rather than in the speculative mode.

Figure 5:
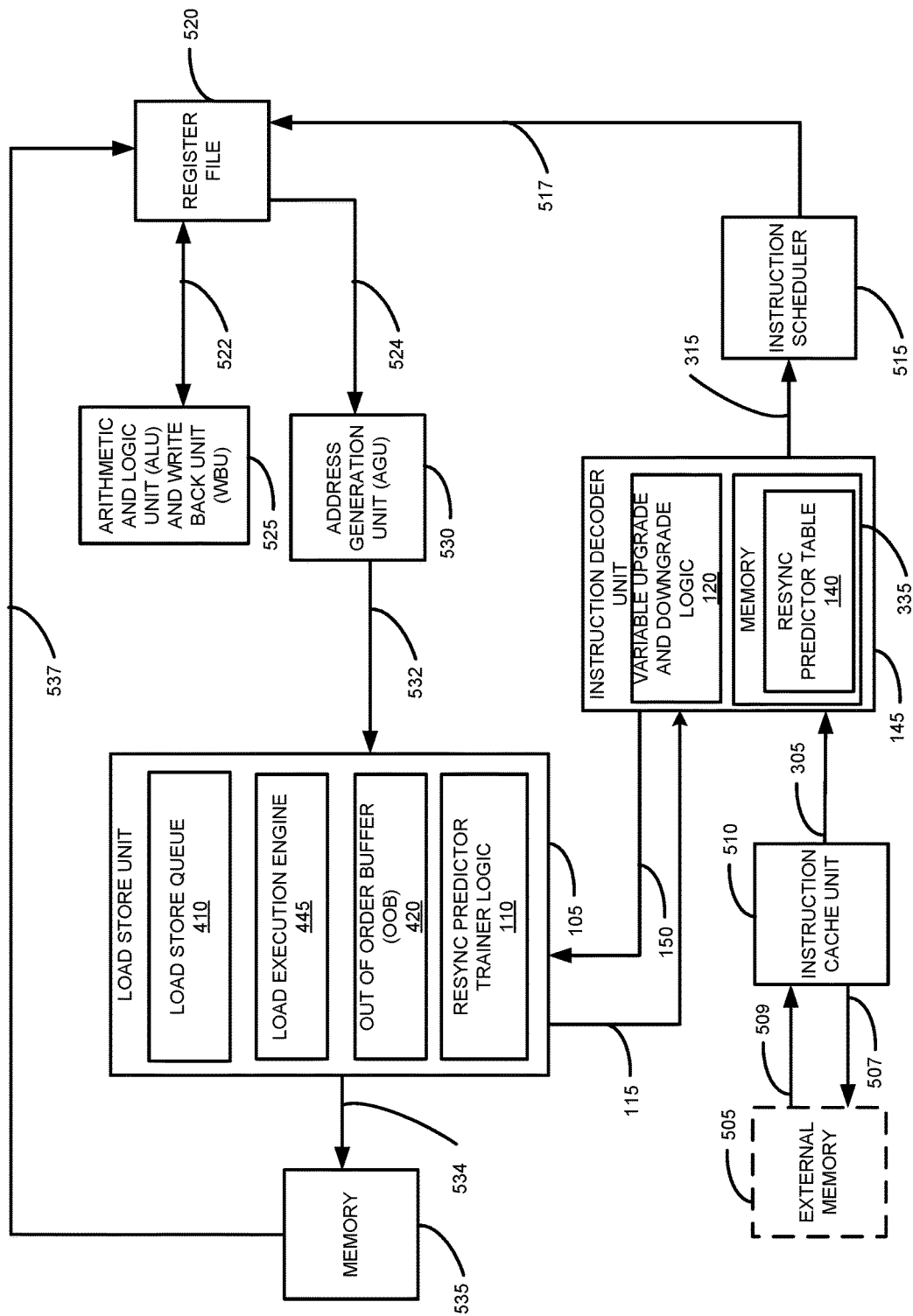
FIG. 5 is a schematic block diagram illustrating another apparatus for executing load instructions in accordance with one embodiment set forth in the disclosure.

FIG. 5 is a schematic block diagram illustrating another example of an apparatus for executing load instructions. The apparatus 500 includes an instruction cache unit (ICU) 510, an instruction decoder unit 145, an instruction scheduler 515, a register file 520, an arithmetic and logic unit (ALU) and write back unit (WBU) 525, an address generation unit (AGU) 530, a load store unit 105, and memory 535.

The ICU 510 sends instruction/address requests 507 that request an external memory 505 to send instruction bytes 509 from particular addresses. The ICU 510 outputs the instruction bytes 305 to the instruction decoder unit 145, which decodes the instruction bytes as explained above. The instruction decoder unit 145 has the knowledge to interpret these instructions and, for example, determine whether an instruction is performing an "add" or a "multiply" function. The instruction decoder unit 145 outputs decoded instruction bytes 315 to the instruction scheduler 515, which orchestrates the order (i.e., scheduling) of the decoded instructions, and outputs ordered decoded instructions 517 to the register file 520. The register file 520 provides operands 522 for executing the ordered decoded instructions 517 to the ALU 525. The ALU 525 executes simple instructions which do not involve memory (e.g., instructions which are purely arithmetical or purely logical), and outputs execution results to the WBU 525. The WBU 525 outputs feedback execution results to the register file 520, after determining which addresses in the register file 520 to store the feedback execution results 522.

The register file 520 provides operands 524 for executing the ordered decoded instructions 517 to the AGU 530. The AGU 530 generates value addresses 532 to fetch values from the memory 535, and inputs the value addresses 532 (e.g., the decoded instruction bytes 315 from FIG. 4) to the load store unit 105. The load store unit 105 receives the value addresses 532 from the AGU 530, and determines the order in which the value addresses 532 are sent to the memory 535, such that the memory 535 fetches data located at particular addresses. The load store unit 105 outputs the stored data results 534 to the memory 535 to write data, and outputs data/address requests 534 to the memory 535 to read data. The memory 535 outputs execution byte results 537 to the register file 520. The load store unit 105 and the instruction decoder unit 145 are explained in greater detail above.

Figure 8:
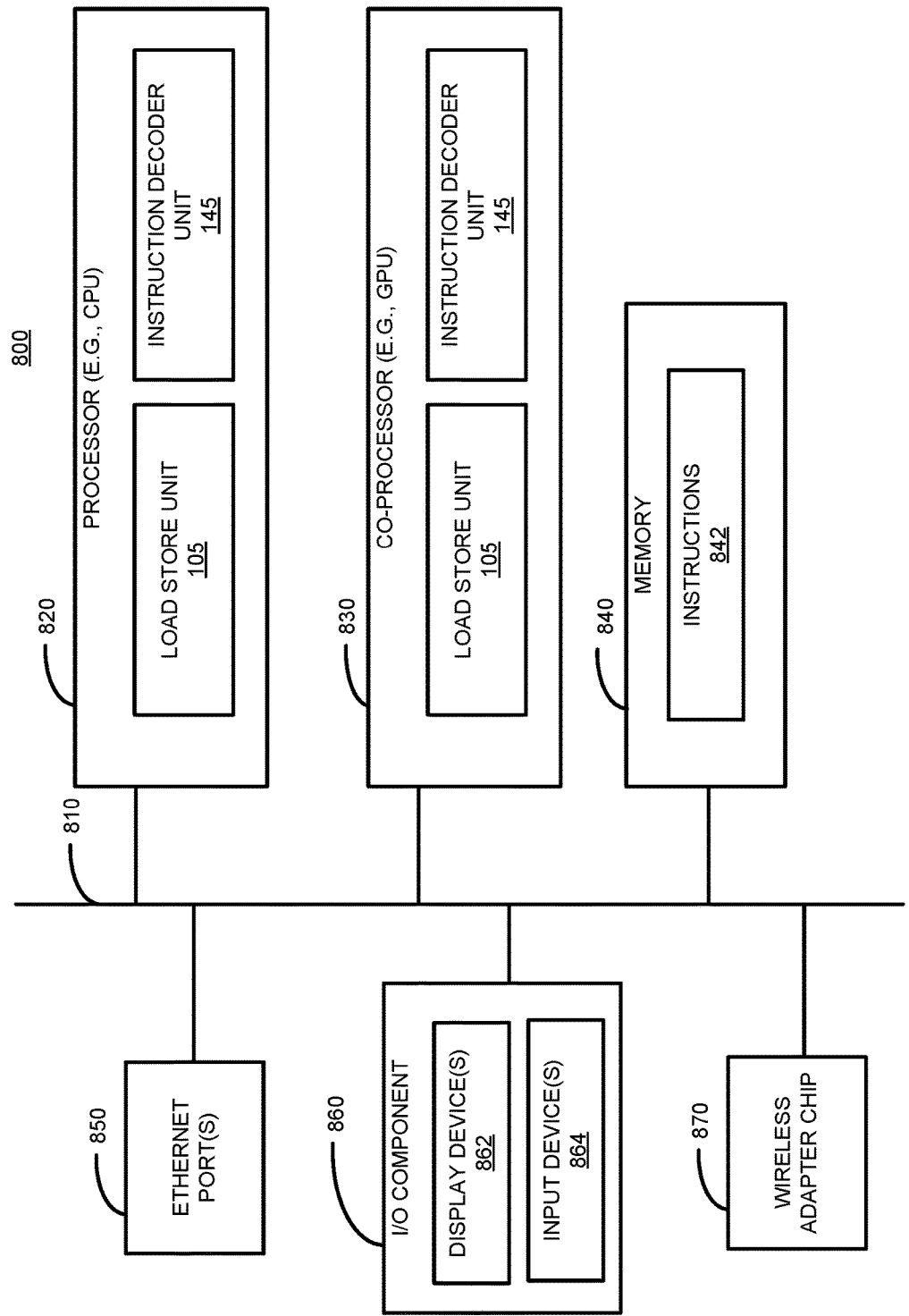
FIG. 8 is a schematic block diagram illustrating another apparatus for executing load instructions in accordance with one embodiment set forth in the disclosure.

FIG. 8 is a schematic block diagram illustrating another example of an apparatus for executing load instructions. The apparatus 800, such as an image processing device, illustrates another example apparatus for implementing method 200 and/or other methods in this disclosure.

Apparatus 800 includes a bus 810 that, directly and/or indirectly, couples the following devices: a processor 820 (e.g., CPU), a co-processor 830 (e.g., GPU), a memory 840, one or more Ethernet port(s) 850, I/O component(s) 860, and wireless adapter chip(s) 870. Any number of additional components, different components, and/or combinations of components is also included in the apparatus 800. In some implementations, the I/O component(s) 860 include a presentation component that presents information to a user such as, for example, a touch screen, display device(s) 862, a speaker, a printing device, and/or the like, and/or an input component such as, for example, a microphone, a joystick, a satellite dish, a scanner, a printer, a wireless device, a keyboard, a pen, a voice input device, a touch input device, a touch-screen device, an interactive display device, a mouse, and/or the like.

The bus 810 represents one or more busses (such as, for example, an address bus, data bus, or combination thereof). Similarly, in some implementations, the apparatus 800 includes a number of processors 820 and co-processors 830, a number of memory components 840, a number of Ethernet port(s) 850, a number of I/O components 860, and/or a number of wireless adapter chip(s) 870. Additionally, any number of these components, or combinations thereof, is distributed and/or duplicated across a number of computing devices.

In one example, the processor 820 (e.g., CPU) includes a load store unit 105 and/or an instruction decoder unit 145 for executing load instructions. The operations of the load store unit 105 and/or the instruction decoder unit 145 are explained above. In one example, the co-processor 830 (e.g., GPU) includes load store unit 105 and/or an instruction decoder unit 145 for executing load instructions. The operations of the load store unit 105 and/or the instruction decoder unit 145 are explained above.

In one example, the memory 840 stores computer-executable instructions 842 that when executed cause the processor 820 and co-processor 830 to implement aspects of embodiments of apparatus components discussed herein and/or to perform aspects of embodiments of methods and procedures discussed herein. The memory 840 is RAM, ROM, or any suitable memory.

The illustrative apparatus 800 shown in FIG. 8 is not intended to suggest any limitation as to the scope of use or functionality of embodiments of the present disclosure. Neither should the illustrative apparatus 800 be interpreted as having any dependency or requirement related to any single component or combination of components illustrated therein.

Also, integrated circuit fabrication systems (e.g., wafer fabrication system) are known that create wafers with integrated circuits based on executable instructions stored on a computer readable medium such as but not limited to CDROM, RAM, other forms of ROM, hard drives, distributed memory, etc. are produced by an integrated circuit design system (e.g., work station). The instructions are represented by any suitable language such as but not limited to hardware descriptor language (HDL), Verilog or other suitable language. As such, the logic and circuits described herein may also be produced as integrated circuits by such fabrication systems using the non-transitory computer readable medium with instructions stored therein. For example, an integrated circuit with the logic and structure described above is created using such integrated circuit fabrication systems. The computer readable medium stores instructions executable by one or more integrated circuit design systems that causes the one or more integrated circuit design systems to fabricate an integrated circuit. For example, the designed integrated circuit includes the load store unit 105 and the instruction decoder unit 145. Further, in some implementations, the integrated circuit generates control information that indicates whether to change a counter value associated with a particular load instruction. In response to the control information, the integrated circuit causes a hysteresis effect for operating between a speculative mode and a non-speculative mode based on the counter value. The hysteresis effect is in favor of the non-speculative mode. The integrated circuit causes the hysteresis effect by incrementing the counter value associated with the particular load instruction by a first value or decrementing the counter value by a second value. The first value is greater than the second value. In some implementations, the fabricated integrated circuit also includes other aspects described herein, such as aspects described in FIGS. 5 and 8.

Among other technical benefits, some implementations of the methods and apparatus described above allow faster processing speeds. For example, by reducing the number of errant load instructions, fewer instructions in the pipeline need to be flushed. As such, the GPU and/or CPU are able to operate more efficiently, allowing for faster processing speeds.

The above detailed description of the present disclosure and the examples described therein have been presented for the purposes of illustration and description only and not by limitation. It is therefore contemplated that the present disclosure covers any and all modifications, variations or equivalents that fall within the scope of the basic underlying principles disclosed above and claimed herein.

What is claimed is:

1. A method of executing load instructions using a processor that comprises a load store unit and an instruction decoder unit, the method comprising:
   generating, by the load store unit, control information that indicates whether to change a counter value associated with a particular load instruction that causes multiple errant loads such that the particular load instruction needs to be re-executed through a resynchronization operation; and
   in response to the control information, causing, by the instruction decoder unit, a hysteresis effect for operating between a speculative mode and a non-speculative mode based on the counter value exceeding a threshold indicating too many re-executions of the particular load instruction wherein the hysteresis effect is caused by incrementing the counter value associated with the particular load instruction by a first value or decrementing the counter value by a second value, the first value being greater than the second value, and wherein the hysteresis effect is in favor of the non-speculative mode.

2. The method of claim 1, wherein the generating the control information comprises:
   generating a plurality of update counter type signals, wherein each of the plurality of update counter type signals is an upgrade signal, a downgrade signal, or an install signal.

3. The method of claim 1, wherein the causing the hysteresis effect for operating between the speculative mode and the non-speculative mode comprises:
   generating, by the instruction decoder unit, a command signal that causes the load store unit to execute a plurality of decoded instructions in the speculative mode or the non-speculative mode based on comparing the counter value to a threshold value.

4. The method of claim 3, wherein the command signal is an in order hazard check signal that causes the load store unit to execute the plurality of decoded instructions in the non-speculative mode.

5. The method of claim 1, wherein the load store unit is configured to execute a plurality of instructions out of order in the speculative mode, and wherein the load store unit is configured to execute the plurality of instructions in order in the non-speculative mode.

6. The method of claim 1, further comprising:
   determining that an instruction, from a plurality of decoded instructions, is an older store instruction indicating a memory address associated with the particular load instruction, and
   wherein the generating the control information is based on the determining that the instruction is the older store instruction and is based on an in order hazard check (IOHC) signal.

7. The method of claim 6, wherein the generating the control information comprises generating an upgrade signal, wherein the upgrade signal directs the instruction decoder unit to increment the counter value by an upgrade value.

8. The method of claim 1, further comprising:
   determining that a plurality of decoded instructions does not contain an older store instruction indicating a memory address corresponding to the particular load instruction,
   wherein the generating the control information is based on the determining that the plurality of decoded instructions does not contain the older store instruction indicating the memory address and an in order hazard check (IOHC) signal.

9. The method of claim 8, wherein the generating the control information comprises generating a downgrade signal, wherein the downgrade signal directs the instruction decoder unit to decrement the counter value by a downgrade value.

10. The method of claim 1, further comprising:
    determining that the control information comprises an upgrade signal associated with the particular load instruction or a downgrade signal associated with the particular load instruction; and
    updating, in a resync predictor table, the counter value associated with the particular load instruction, wherein the detected upgrade signal increments the counter value by a first value, wherein the detected downgrade signal decrements the counter value by a second value, the first value being greater than the second value.

11. A processor comprising:
    a load store unit configured to:
      generate control information that indicates whether to change a counter value associated with a particular load instruction that causes multiple errant loads such that the particular load instruction needs to be re-executed through a resynchronization operation; and
    an instruction decoder unit configured to:
      in response to the control information, cause a hysteresis effect for operating between a speculative mode and a non-speculative mode based on the counter value exceeding a threshold indicating too many re-executions of the particular load instruction, wherein the hysteresis effect is in favor of the non-speculative mode wherein the hysteresis effect is caused by incrementing the counter value associated with the particular load instruction by a first value or decrementing the counter value by a second value, the first value being greater than the second value.

12. The processor of claim 11, wherein the load store unit is configured to generate the control information by:
    generating a plurality of update counter type signals, wherein each of the plurality of update counter type signals is an upgrade signal, a downgrade signal, or an install signal.

13. The processor of claim 11, wherein the instruction decoder unit is configured to cause the hysteresis effect for operating between a speculative mode and a non-speculative mode by:
  generating a command signal that causes the load store unit to execute a plurality of decoded instructions either in the speculative mode or the non-speculative mode based on comparing the counter value to a threshold value.

14. The processor of claim 11, wherein the load store unit is configured to execute a plurality of instructions out of order in the speculative mode, and wherein the load store unit is configured to execute the plurality of instructions in order in the non-speculative mode.

15. A processor comprising:
  a load store unit configured to:
    generate, based on a plurality of decoded instructions, control information that indicates whether to increment a counter value associated with a particular load instruction that causes multiple errant loads such that the particular load instruction needs to be re-executed through a resynchronization operation, by a first value or decrement the counter value by a second value, the first value being greater than the second value wherein a hysteresis effect is caused by incrementing the counter value associated with the particular load instruction by the first value or decrementing the counter value by the second value;
  an instruction decoder unit, wherein the instruction decoder unit is configured to:
    generate a command signal that causes the load store unit to execute instructions from a first mode to a second mode based on the control information; and
  wherein:
    the first mode is a non-speculative mode and the second mode is a speculative mode; and
    the load store unit is configured to:
      execute the plurality of decoded instructions in order in the non-speculative mode; and
      execute the plurality of decoded instructions out of order in the speculative mode.

16. The processor of claim 15, wherein the load store unit is further configured to:
  determine, based on the plurality of decoded instructions, that an instruction, from the plurality of decoded instructions, is an older store instruction indicating a memory address associated with the particular load instruction, and
  wherein the load store unit generates the control information based on the determining that the instruction is the older store instruction and an in order hazard check (IOHC) signal.

17. The processor of claim 16, wherein the control information comprises an upgrade signal, wherein the upgrade signal directs the instruction decoder unit to increase the counter value for the memory address by the first value.

18. The processor of claim 15, wherein the load store unit is further configured to:
  determine that the plurality of decoded instructions does not contain an older store instruction indicating a memory address associated with the particular load instruction, and
  wherein the load store unit generates the control information based on the determining that the plurality of decoded instructions does not contain the older store and an in order hazard check (IOHC) signal.

19. The processor of claim 18, wherein the control information comprises a downgrade signal, wherein the downgrade type signal directs the instruction decoder unit to decrease the variable strength counter for the memory address by the second value.

20. The processor of claim 15, wherein the instruction decoder unit is further configured to:
  determine, based on the control information, an upgrade signal indicating a memory address associated with the particular load instruction; and
  increasing, in a resync predictor table, the counter value for the memory address by the first value.

21. The processor of claim 20, wherein the instruction decoder unit is configured to generate the command signal that causes the load store unit to execute the plurality of decoded instructions from the first mode to the second mode by:
  generating an in order hazard check (IOHC) signal based on the increased counter value being greater than the threshold value, wherein the IOHC signal causes the processor to execute instructions in order; and
  providing, to the load store unit, the IOHC signal.

22. The processor of claim 15, wherein the instruction decoder unit is further configured to:
  determine, based on the control information, a downgrade signal indicating a memory address associated with the particular load instruction; and
  decrease the counter value for the memory address by the second value.

23. The processor of claim 15, wherein the instruction decoder unit is configured to generate the command signal that causes the load store unit to execute the plurality of decoded instructions from the first mode to the second mode by:
  causing, based on the decreased counter value being less than the threshold value, the processor to execute instructions out of order.

* * * * *